Nov. 29, 1955 T. T. VILE 2,725,062
EGG WASHER
Filed Oct. 16, 1953 2 Sheets-Sheet 1

INVENTOR.
Thomas T. Vile
BY
McMorrow, Berman & Davidson
ATTORNEYS

Nov. 29, 1955 T. T. VILE 2,725,062
EGG WASHER
Filed Oct. 16, 1953 2 Sheets-Sheet 2
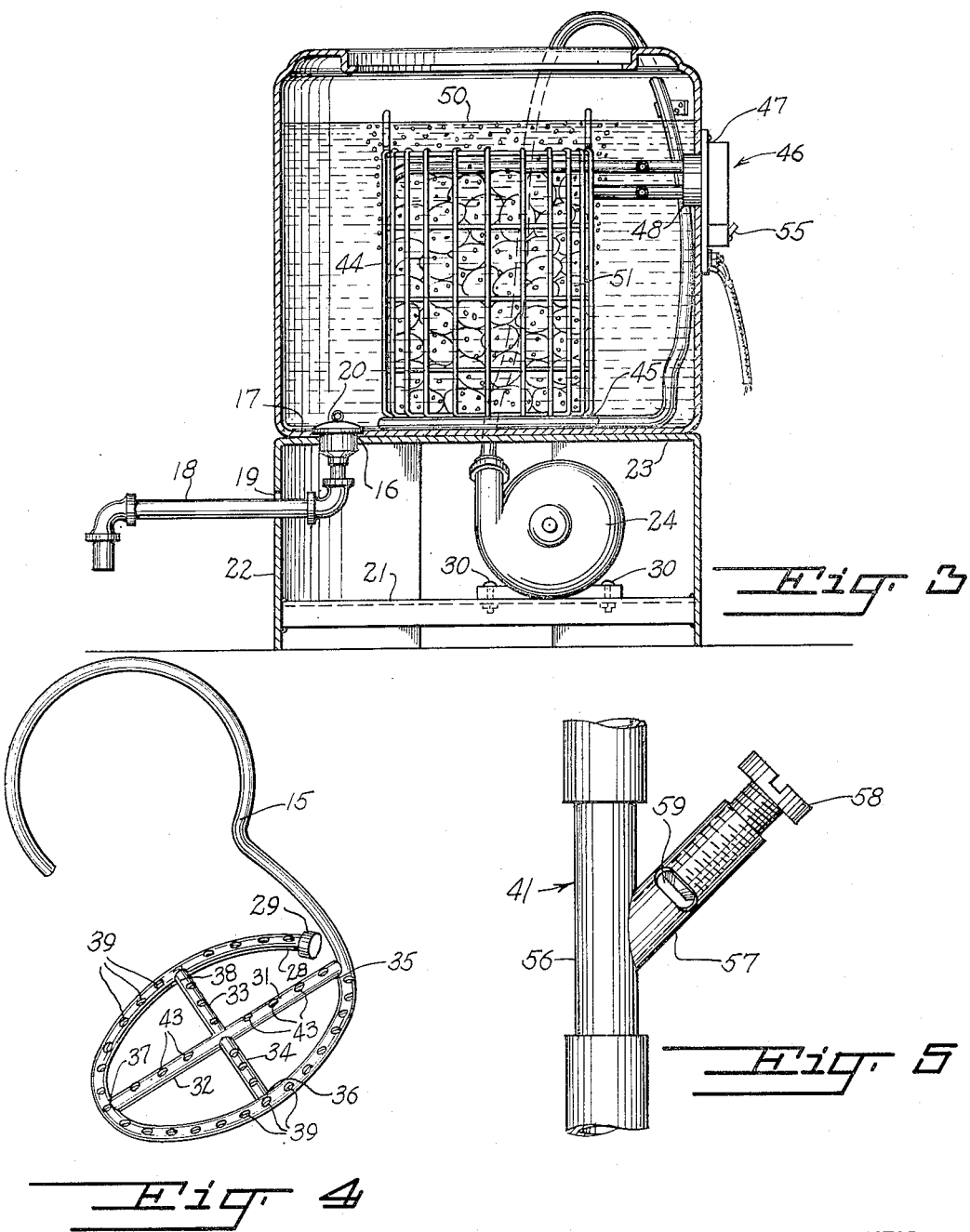
INVENTOR.
Thomas T. Vile
BY
McMorrow, Berman + Davidson
ATTORNEYS

2,725,062
EGG WASHER

Thomas Terrel Vile, New Egypt, N. J.

Application October 16, 1953, Serial No. 386,430

1 Claim. (Cl. 134—94)

This invention relates to improvements in egg washing devices and more particularly to an egg washer in which the washing is accomplished by air pressure causing water agitation.

It is a primary object of this invention to provide an egg washing apparatus which can be operated by a single operator, does not require a high degree of skill or proficiency for its efficient operation, and is simple and rugged in construction with low manufacturing cost.

Another object of this invention is to provide an apparatus whereby eggs may be washed more quickly and in volume, and is adaptable to production line methods.

It is a further object of this invention to provide the washing action for the eggs by having the water in which the eggs are to be washed agitated by air pressure from a small blower incorporated into the apparatus.

It is a still further object of this invention to provide an air pressure regulator in the air line so that the degree of agitation can be so controlled that the eggs deposited therein will be thoroughly washed in a short period of time without breaking or cracking any of the eggs.

Other objects and advantages will become apparent from a consideration of the following description and the appended claim in conjunction with the accompanying drawings, wherein:

Figure 3 is a cross sectional view taken on line 3—3 of Figure 2;

Figure 4 is a perspective view of the air coil according to this invention; and

Figure 5 is a side elevational view of the air regulator according to this invention.

Figure 1:
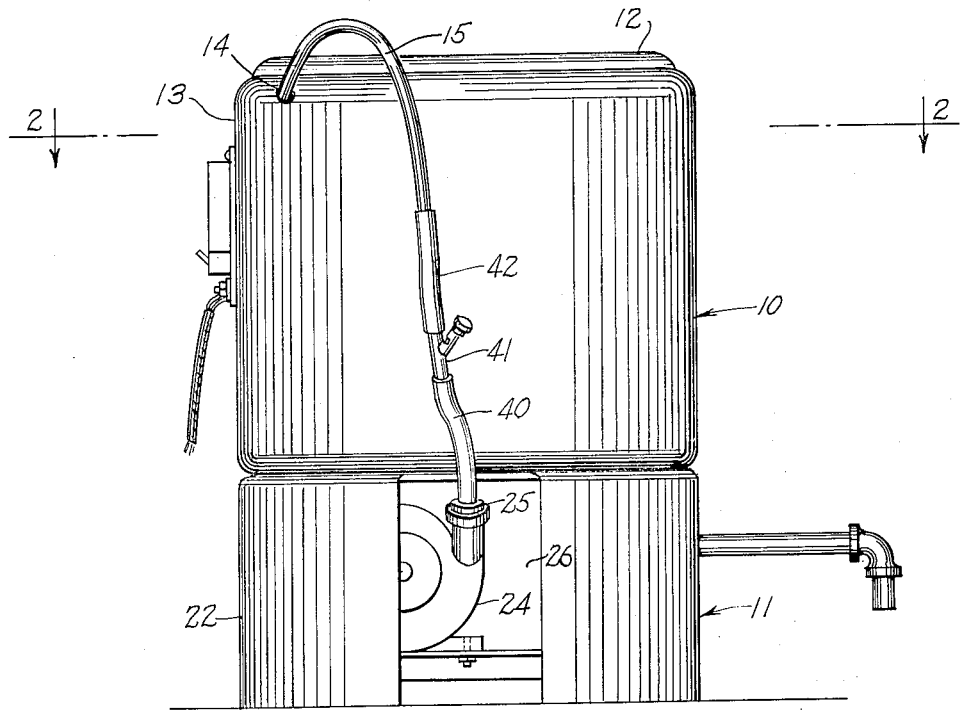
Figure 1 is a side elevation of an egg washing apparatus according to this invention.
Figure 2:
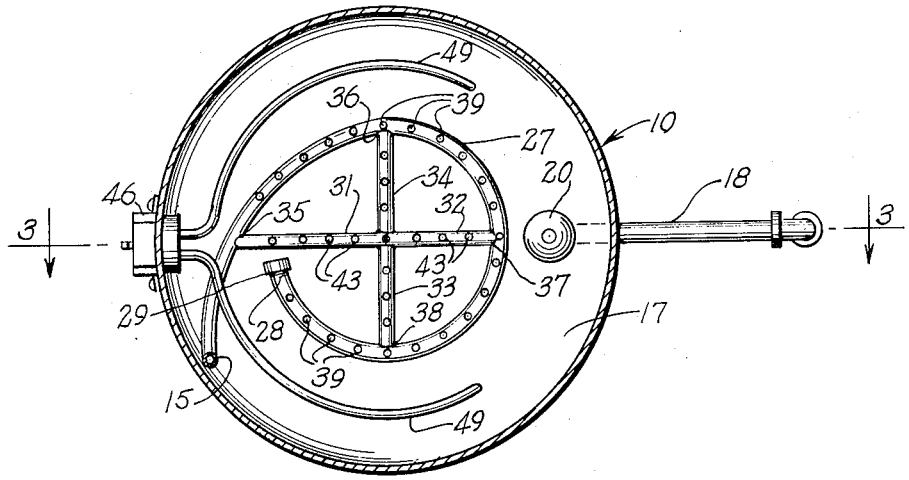
Figure 2 is a sectional view taken on line 2—2 of Figure 1.

The egg washing apparatus as shown in Figure 1 comprises a cylindrical tank or tub, generally indicated at 10, supported upon a cylindrical base support member 11. The tank 10 may be provided with a cover or lid 12 to fit around the open top of the tank. In the side wall 13 of tank 10, an aperture 14 adjacent the top thereof to receive an air conduit 15 therethrough is provided. Aperture 14 being of such diameter as to make a close sliding fit with the conduit 15. A drain 16 is provided in the bottom wall 17 of the tank 10 adjacent the side wall 13. Tapped into the drain 16 is a drain pipe 18 with the usual necessary pipe fittings. Drain pipe 18 extends below tank 10 and is let out through an opening 19 in the side wall 22 of the base support 11 and thence to a sewer or sump runoff (not shown). Drain 16 is fitted with a removable drain plug 20.

Turning attention now to the base support 11 for tank 10, it will be seen that a cross brace or support 21 made of angle iron stock or similar material, extends horizontally across the interior of base 11 and is secured to the side wall 22, as by welding, at points slightly above the lower end of the side wall. The base support 11 has a solid top 23 formed integrally with the side wall 22, the bottom of support 11 may be opened.

An air blower 24 is bolted, as by bolts 30, to the cross brace 21 and has one end of the flexible air conduit, such as hose 40, connected thereto as to 25 as by a coupling or any suitable connecting means. Air hose 40 is led through a large access opening 26 in the side wall 22 of supporting base 11, and upwardly on the outside of tank 10. An air regulator 41 is inserted into the hose 40 and another length of the flexible air conduit in the form of a length of hose 42 is inserted into the other end opening of the regulator 41. Air conducting means 15 is inserted into the other end of hose length 42. Means 15 is preferably copper tubing so bent and shaped as to enter opening 14 and extend downwardly into the tank 10. A lower extremity of the tubing or air conduit 15 is formed into an air coil or ring 27 in the shape of one turn of a spiral and adapted to lie flat on the bottom 17 of tank 10.

Air coil 27 (see Figure 4) is provided with a series of spaced holes 39 drilled into the top surface of the tubing forming the coil, the purpose of which will appear subsequently. Short lengths of tubing 31, 32, 33 and 34 are joined together by welding, or a suitable threaded fitting may be employed, to form a cross through which air may freely pass. The cross formed by tubing lengths 31 to 34 is welded to the coil 27 at points 35, 36 and 38 about the inner periphery of the coil 27. It will be evident that a continuous passage is provided between the tubing lengths and the coil 27 so that air may freely circulate through all these connected parts. Tubing lengths 31 to 34 have holes 43 therein similar to holes 39 in the coil 27.

An open work container in the form of a wire basket 44, into which eggs to be washed are placed, is set over and rests upon the coil 27 in the tank 10. The diameter of the basket 44 bottom 45 is of such dimension as to closely approximate the diameter of the coil 27.

Heating unit 46 is attached to the side wall 13 of tank 10 and comprises a base 47 which may be riveted, or otherwise suitably secured, to the side wall 13, a circular boss or collar 48 from which two resistant type units or rods 49 are supported. Rods 49 are secured in the collar 47 and extend circularly generally equidistant from the wall of tank 10. A toggle type "on"-"off" switch 55 controls the action of the heating unit 46.

The operation of the egg washing apparatus will now be described, with the drain plug 20 in place, tank 10 is filled with sufficient water indicated by reference numeral 50, into which a suitable cleaning agent such as a detergent is dissolved. Egg basket 44 filled with the eggs 51 to be washed is placed in the tank 10, bottom 45 of the basket 44 being placed upon the air coil 27 and supported thereon.

It should be here pointed out that it has been found that best washing results are obtained when the water is about 120° F., the heating unit 46 will function to preheat the water to the desired temperature.

The eggs in basket 44 are subjected to a washing action due to air supplied from blower 24, carried through the hose length 40, regulator 41, hose 42 and tube 15, escaping through the holes 39 and 43 in the air coil 27 which rests on the bottom of tank 10. Agitation of the water by the escaping air forming bubbles, which rises to the top of the water or washing medium 50, is gentle and tends to separate the eggs from each other and rotate them slowly so that all surfaces of each egg will be exposed to the washing action of the cleaning agent dissolved in the water.

In order to control the amount of air permitted to escape through the holes in coil 27, an air regulator 41 is provided in the air line from the blower 24 to the coil 27. With reference to Figure 5, the regulator 41 is a forked tube or pipe comprising a straight length of pipe or tubing 56 which forms one arm of the fork and an integral extension 57 projecting upwardly and outwardly at an angle to the tube segment 56 in forming the second arm of the fork. The outer end of tube extension 57 is internally threaded to receive a cap screw 58 which is the adjustable means by which the flow of air from blower 24 can be controlled. An opening or slot 59 is cut into the tube extension 57. As the adjusting screw 58 is tightened farther into the tube section 57, the opening 59 will gradually be closed, and movement of the screw 58 in opposite direction will afford the maximum opening. It is evident that as slot 59 is opened or closed to the atmosphere by adjusting screw 58, more or less air from blower 24 will be vented through the slot and a corresponding volume of air will continue to the coil 28 and escape through the holes 39 and 43. Hence, the amount of air and consequently the amount of water agitation, flowing into the coil 27 can be controlled by adjusting screw 58 in relation to slot 59 permitting more or less air pressure to be vented to the atmosphere.

The eggs are washed from two to three minutes in the apparatus, the basket 44 is then lifted out and when dry, the eggs are ready for packing into boxes or crates as desired. The single operator, it has been found, can process two thousand eggs in less than one hour whereas the same number of eggs when hand cleaned would take about eight hours.

From the foregoing, it is evident that an egg washing apparatus has been provided in which the eggs to be cleaned are placed into a wire basket 44, which basket is then put into the apparatus. A stream of air generated by blower 24, controlled as to volume by air regulator 41, escapes through holes in a coiled pipe or tube 27 to cause water in tank 10 to be agitated thus producing a gentle washing action upon the eggs, rotating the eggs during the washing process being also accomplished by the washing action.

It is to be understood that the water in tank 10 may be drained as it becomes unserviceable through the accumulation of dirt and soil by removing the drain plug 20. Further, after tank 10 is freshly filled with water, detergent or other cleansing agents may be added, the water heated to approximately 120° F. and basket 44 containing a plurality of eggs 51 placed in tank 10 so as to rest upon the air coil 27, the top cover 12 will be replaced on tank 10. After the washing operation is completed, the lid or cover 12 will be removed and the basket 44 lifted out.

The hose 40, regulator 41, hose 42 and tubing 15 may be termed an air conducting means from the source of air pressure, blower 24, while the air ring or coil 27 may be considered as an air escape means permitting water 50 in tank 10 to be agitated to wash eggs 51 in wire basket 44.

While there are shown and described the preferred embodiments of the invention, it is to be understood that the structure is susceptible to change and modification within the practicability of the invention and therefore should be limited only by the scope of the claim appended thereto.

What is claimed is:

An egg washing apparatus comprising a hollow base support member, a water tank supported upon said member and adapted to receive an open-work container therein into which eggs to be washed are deposited, a cross brace extending across said member, a source of air pressure carried on said cross brace; an air conducting means from said source including an air conduit connected at one end to said source, an air coil having spaced holes therein connected at the other end of said conduit disposed adjacent the bottom of said tank below the level of the water therein, a cross of tubing having spaced holes therein extending across said air coil and in communication therewith; said source of air pressure operative to cause escape of air from said openings in said coil and said cross of tubing to cause agitation of the water in said tank to effect a cleansing action on the eggs, and an air regulator in said air conducting means comprising a forked tube having two arms, a slot open to the atmosphere in one of said arms, an adjusting screw in said one arm, said adjusting screw extending below said slot when fully threaded into said one arm to close said slot to the atmosphere to thereby control the amount of water agitation by selectively placing the adjusting screw so as to thereby vary the area of the slot exposed to the atmosphere.

References Cited in the file of this patent

UNITED STATES PATENTS

| | | |
|---|---|---|
| 596,536 | Park | Jan. 4, 1898 |
| 739,480 | Davenport | Sept. 22, 1903 |
| 1,102,303 | Sly | July 7, 1914 |
| 1,189,707 | Lofquist | July 4, 1916 |
| 1,950,208 | Anderson | Mar. 6, 1934 |
| 2,135,043 | Seman | Nov. 1, 1938 |
| 2,241,940 | Atkins | May 13, 1941 |
| 2,519,654 | Heaney | Aug. 22, 1950 |
| 2,520,354 | Zinty | Aug. 29, 1950 |